US010556303B2

(12) United States Patent
Tokura (10) Patent No.: US 10,556,303 B2
(45) Date of Patent: Feb. 11, 2020

(54) HEAT EXCHANGER, AIR CONDITIONER AND EXTERNAL UNIT

(71) Applicant: KYOSHIN KOGYO CO., LTD., Osaka-shi, Osaka (JP)

(72) Inventor: Kenji Tokura, Osaka (JP)

(73) Assignee: KYOSHIN KOGYO CO., LTD., Osaka-shi, Osaka (JP)

( * ) Notice: Subject to any disclaimer, the term of this patent is extended or adjusted under 35 U.S.C. 154(b) by 84 days.

(21) Appl. No.: 15/793,889

(22) Filed: Oct. 25, 2017

(65) Prior Publication Data

US 2018/0050427 A1 Feb. 22, 2018

Related U.S. Application Data

(60) Division of application No. 14/740,262, filed on Jun. 16, 2015, now Pat. No. 10,016,858, which is a
(Continued)

(30) Foreign Application Priority Data

Dec. 19, 2012 (JP) .................................. 2012-289390
Dec. 16, 2013 (JP) .................................. 2013-273826

(51) Int. Cl.
*B23P 15/26* (2006.01)
*F28F 1/32* (2006.01)
(Continued)

(52) U.S. Cl.
CPC .............. *B23P 15/26* (2013.01); *B21D 39/20* (2013.01); *B21D 53/06* (2013.01); *B21D 53/085* (2013.01);
(Continued)

(58) Field of Classification Search
CPC ......... Y10T 29/49373; Y10T 29/49375; Y10T 29/53113; Y10T 29/53117; Y10T 29/53122; B23P 15/26
(Continued)

(56) References Cited

U.S. PATENT DOCUMENTS 2,649,889 A * 8/1953 Dudley .................. B21D 39/10
29/281.5
4,761,866 A * 8/1988 Murphy ................. B21D 41/02
29/406
(Continued)

FOREIGN PATENT DOCUMENTS

CN 102510780 A 6/2012
JP 2000-301271 A 10/2000
(Continued)

OTHER PUBLICATIONS

International Search Report for PCT/JP2013/084775 dated May 27, 2014.
(Continued)

*Primary Examiner* — Jason L Vaughan
(74) *Attorney, Agent, or Firm* — Yokoi & Co., U.S.A.; Toshiyuki Yokoi (57) ABSTRACT

The present invention provides manufacturing method of a heat exchanger that, even if the position of a tube opening portion of a tube of a heat exchanger for which tube expansion is conducted, varies depending on the type of a heat exchanger, a mechanism adjusting the stop position of a flare plate as well as any complicated adjusting work therefor are not necessary and a heat exchanger in which flares in the same shape and in constant certain depth are formed at an opening portion of a tube of various kinds of heat exchangers having different total lengths in the longitudinal direction, and a device for a heat exchanger manufacturing method, and an air conditioner and/or outdoor unit
(Continued)

thereof equipped with a heat exchanger manufactured using said manufacturing method.

5 Claims, 2 Drawing Sheets

Related U.S. Application Data continuation of application No. PCT/JP2013/084775, filed on Dec. 18, 2013.

(51) Int. Cl.
    *B21D 39/20*     (2006.01)
    *B21D 53/08*     (2006.01)
    *B21D 53/06*     (2006.01)
    *F28F 1/12*     (2006.01)
    *F28D 21/00*     (2006.01)

(52) U.S. Cl.
    CPC ............... *F28F 1/12* (2013.01); *F28F 1/32* (2013.01); *F28D 2021/0068* (2013.01); *F28F 2275/125* (2013.01); *Y10T 29/4935* (2015.01); *Y10T 29/53122* (2015.01)

(58) Field of Classification Search
    USPC .................................. 29/726, 726.5, 727
    See application file for complete search history.

(56) References Cited

U.S. PATENT DOCUMENTS

| | | | | |
|---|---|---|---|---|
| 4,782,571 A | * | 11/1988 | Krips | B21D 39/06 29/447 |
| 4,858,305 A | * | 8/1989 | Gray | B21D 41/02 29/727 |
| 5,097,590 A | * | 3/1992 | Tokura | B21D 53/085 29/727 |
| 5,099,677 A | * | 3/1992 | Tokura | B21D 53/085 29/727 |
| 5,432,994 A | * | 7/1995 | Tokura | B21D 53/085 29/726.5 |
| 5,687,473 A | * | 11/1997 | Tokura | B21D 53/085 29/726.5 |
| 5,815,913 A | * | 10/1998 | Tokura | B21D 53/085 29/727 |
| 7,448,127 B2 | * | 11/2008 | Tokura | B21D 53/085 29/726 |
| 8,087,159 B2 | * | 1/2012 | Tokura | B21D 39/20 29/727 |
| 8,276,261 B2 | * | 10/2012 | Baba | B21D 39/06 29/270 |
| 9,015,943 B2 | * | 4/2015 | Tokura | B21D 39/06 165/181 |
| 9,592,576 B2 | * | 3/2017 | Tanaka | B21D 39/20 |

FOREIGN PATENT DOCUMENTS

| | | |
|---|---|---|
| JP | 2002-205134 A | 7/2002 |
| JP | 2003-075086 A | 3/2003 |
| JP | 2009-248138 A | 10/2009 |

OTHER PUBLICATIONS

PCT written openion dated May 27, 2014.
Indian examination report dated Jan. 30, 2019.
Thai examination report dated Oct. 30, 2018.
Vietnamese examination report dated Dec. 24, 2018.

\* cited by examiner

HEAT EXCHANGER, AIR CONDITIONER AND EXTERNAL UNIT

CROSS-REFERENCES TO RELATED APPLICATIONS

This Application claims the benefit of priority and is a Continuation application of the prior International Patent Application No. PCT/JP2013/084775, with an international filing date of Dec. 18, 2013, which designated the United States, and is related to the Japanese Patent Application No. 2012-289390, filed Dec. 19, 2012 and the Japanese Patent Application No. 2013-273826, filed Dec. 16, 2013, the entire disclosures of all applications are expressly incorporated by reference in their entirety herein.

BACKGROUND OF THE INVENTION

1. Field of the Invention

The present invention relates to manufacturing method for a heat exchanger and a device therefor, and an air conditioner and/or external unit thereof equipped with a heat exchanger manufactured using the method, wherein, even if a hairpin tube or a straight tube inserted into each through-hole of a multiply-polymerized heat radiating fin is expanded and integrally formed with a heat radiating fin, the total length of a hairpin tube or a straight tube to be expanded can be remained almost the same as the one prior to the tube expansion and the flared processing can be effectively conducted on the same process.

2. Description of Related Art

For example, so far, an art integrally using the technologies of both of unexamined patent application publication No. 2002-205134 and unexamined patent application publication No. 2000-301271 is existing as a manufacturing method for a heat exchanger where the length of a tube to be expanded can be remained approximately the same as the one prior to the tube expansion.
Patent Literature 1: Unexamined Patent Application Publication No. 2002-205134
Patent Literature 2: Unexamined Patent Application Publication No. 2000-301271

BRIEF SUMMARY OF THE INVENTION

Problems that the present invention is to solve is indicated below. That is, the manufacturing method for a heat exchanger included in the above former publication relates to a tube expansion device which is reciprocally movable along the longitudinal direction of posts founded on a base of a tube expansion device, is also able to fit onto a tube in order to set a protrusion length of the tube protruded from an end plate of a heat exchanger set at said base, and has a reference platform to stop a stripper plate having a stripper of which tip comes into contact with an end plate and which pushes down an end plate; and the manufacturing method for a heat exchanger included in the above latter publication uses a gripping body which is interchangeable with said stripper and has a plurality of tube contacting members freely expanding and shrinking radially in a direction crossing the longitudinal direction of a tube, can keep the total length of a tube to be expanded using the gripping body almost the same as the one prior to the tube expansion, and can conduct the second and third flared processing for a tube opening of a tube after the so-called first tube expansion.

Still more, further detailed explanation on a tube expansion device integrally using both technologies of said former publication and the latter publication is as follows: after the steps of causing a first plate (stripper plate) with a gripping body to move downward to a tube protruded from an end plate of a heat exchanger, causing the tip of a tube contacting member of a gripping body to come into contact with the end plate and causing a first plate member to move further downward, the first plate member is prevented from moving through the first plate member coming into contact with a reference platform and the protrusion length of a tube from an end plate can be set using a tube contacting member of a gripping body.

Then, the heat exchanger can be manufacture by the following method: forming a tube opening portion in predetermined length by pressing a tube expansion mandrel into a tube opening portion of a tube, and then, gripping and holding a periphery of the tube expansion portion by a plurality of tube contacting members of the gripping body, which freely expands and shrinks radially, and then, expanding a tube through a tube expansion mandrel by moving a mandrel plate member downward again, and then, releasing said tube opening from the fixing by a tube contacting member, and then, conducting the flare processing by moving downward a flare plate with a flare punch toward a heat exchanger and pressing a flare punch into said tube opening portion.

However, while a tube expansion device having the above construction performs a flared processing by moving down a flare plate having a flare punch toward a heat exchanger and pressing a flare punch into said tube opening portion, the length of a tube used for a heat exchanger for which tube expansion is conducted (since the total length of a heat exchanger changes, the position of an end plate also naturally changes) is not always constant.

Therefore, there exists a problem that an adjusting device is required to adjust the stopping position of a flare plate which moves downward whenever the position of an end plate of a heat exchanger for which the tube expansion is conducted changes and the adjustment work is also cumbersome.

That is, the present invention provides an extremely excellent manufacturing method for a heat exchanger and a device therefor, and an air conditioner and/or external unit thereof equipped with a heat exchanger manufactured using the method, wherein even if the position of a tube opening portion of a tube of a heat exchanger to be expanded changes, in more details, the position of a tube opening portion of a tube protruded in predetermined protrusion length protruded from an end plate of a heat exchanger varies as required, an adjusting device to adjust in each case the stopping position of a flare plate on which flared processing is conducted is not required, and cumbersome adjustment work using the adjusting device is also not required at all; and even if each tube inserted in a zigzag pattern to a heat radiating fin of a heat exchanger forms multiple columns such as 3 columns, 4 columns, etc. to narrow each other's distance, a tube located inside can be held surely and solidly as is the case with a straight tube or a hairpin tube located outside; and even if tube diameter of a tube of a heat exchanger, for which tube expansion is conducted, varies due to kinds of specifications of a heat exchanger, a tube opening portion side of a tube can be held surely and solidly and a complicated flared processing can be conducted for a tube in the same processing.

Thus, the present invention is to invent a totally new manufacturing method for a heat exchanger and device therefor to solve the above problems and takes the steps indicated below.

That is, a heat exchanger 5 comprises a plurality of heat radiating fins, end plates 5a sandwiching the plurality of heat radiating fins and a tube 7 inserted to each of end plates, and freely expands and shrinks radially in a direction crossing the longitudinal direction of a tube 7 from a tube opening portion 7b side of a tube 7 protruded from an end plate 5a, and has a surface expanding radially toward the direction of a tube 7 at outer circumference, and a manufacturing method of a heat exchanger comprises: causing a gripping body base 3h with a gripping body 3 having said plurality of tube contacting members 3f which can cover the tube 7 to move toward a heat exchanger 5, and, thereafter, stopping the movement of a gripping body base 3h toward a heat exchanger 5 by causing a moving gripping body base 3h to come into contact with Aa a reference platform A setting protrusion length of a tube 7 protruded from an end plate 5a, and, after that, firmly fixing and holding the gripping body base 3h and a reference platform A through a locking means Ab, and, thereafter, forming a tube expansion 7d in predetermined length by pressing a tube expansion mandrel 2 into a tube opening portion 7b of a tube 7 protruded from an end plate 5a, wherein a tube expansion mandrel 2 exists in said gripping body 3 in freely reciprocating fashion, and, after that, gripping a tube expansion portion 7d by a plurality of tube contacting members 3f through causing a sliding base 3d with a gripping body sliding means Xa fitting onto and sliding on a gripping body 3 which is provided between the end plate 5a and a gripping body base 3h and has said plurality of tube contacting members to move C1 toward a heat exchanger, and, thereafter, releasing a tube expansion portion 7d from the gripping of a tube contacting member 3f by retreating C2 a sliding base 3d from a heat exchanger 5, after having expanded a tube 7 by moving forward a tube expansion mandrel 2 again, and, thereafter, connecting a flare base B and a gripping body base 3h, wherein the flare base B exists more rearward than said gripping body base 3h with a certain distance, has a predetermined length so that a tube expansion mandrel 2 becomes fitting onto condition within said gripping body 3 and has a flare pipe 10a with a flare punch for flared processing at the tip, conducting a predetermined flared processing 7j by pressing a flare punch 10 into a tube expansion portion 7d at a tube opening portion 7b side through pulling C3 toward a gripping body base 3h, which is firmly fixed and held to a reference platform A through locking means, via a connecting and tensile force generating means that generates a tensile force in a direction of pulling toward each other in a certain distance, and, thereafter, retreating each of a flare base B, a gripping body base 3h and a sliding base 3d from a heat exchanger 5.

Additionally, a heat exchanger 5 comprises a plurality of heat radiating fins, end plates 5a sandwiching said plurality of heat radiating fins and a tube 7 inserted to each of end plates, and freely expands and shrinks radially in a direction crossing the longitudinal direction of a tube 7 from a tube opening 7b side of a tube 7 protruded from an end plate 5a, and has a surface expanding radially toward the direction of a tube 7 at outer circumference, and a manufacturing method of a heat exchanger in the present invention comprises: causing a gripping body base 3h with a gripping body 3 having said plurality of tube contacting members 3f which can cover said tube 7 to move toward a heat exchanger 5, and, thereafter, stopping the movement of a gripping body base 3h toward a heat exchanger 5 by causing a moving gripping body base 3h to come into contact with Aa a reference platform A setting protrusion length of a tube 7 protruded from an end plate 5a, and, after that, firmly fixing and holding the gripping body base 3h and a reference platform A through a locking means Ab, and, thereafter, forming a tube expansion 7d in predetermined length by pressing a tube expansion mandrel 2 into a tube opening portion 7b of a tube 7 protruded from an end plate 5a, wherein a tube expansion mandrel 2 exists in said gripping body 3 in freely reciprocating fashion, and, after that, gripping a tube expansion 7d by a plurality of tube contacting members 3f through causing a sliding base 3d with a gripping body sliding means Xa fitting onto and sliding on a gripping body 3 which is provided between said end plate 5a and a gripping body base 3h and has a plurality of tube contacting members to move C1 toward a heat exchanger, and, thereafter, connecting said flare base B and said gripping body base 3h, wherein the flare base B exists more rearward than the gripping body base 3h with a certain distance, has a predetermined length so that a tube expansion mandrel 2 becomes fitting onto condition within a gripping body base 3 and has a flare pipe 10a with a flare punch for flared processing at the tip, conducting a predetermined flared processing 7j by pressing a flare punch 10 into a tube expansion 7d at a tube opening portion 7b side through pulling C3 toward a gripping body base 3h, which is firmly fixed and held to a reference platform A through locking means, via a connecting and tensile force generating means that generates a tensile force in a direction of pulling toward each other with a certain distance, and, thereafter, releasing a tube expansion 7d from a gripping of tube contacting member 3f by causing a sliding base 3d to retreat C2 from a heat exchanger 5, retreating each of a flare base B, a gripping body base 3h and a sliding base 3d from the heat exchanger 5.

Additionally, a heat exchanger 5 comprises a plurality of heat radiating fins, end plates 5a sandwiching said plurality of heat radiating fins and a tube 7 inserted to each of end plates, and freely expands and shrinks radially in a direction crossing the longitudinal direction of a tube 7 from a tube opening 7b side of a tube 7 protruded from an end plate 5a, and has a surface expanding radially toward the direction of a tube 7 at outer circumference, and a manufacturing method of a heat exchanger in the present invention comprises: causing a gripping body base 3h with a gripping body 3 having said plurality of tube contacting members 3f which can cover said tube 7 to move toward a heat exchanger 5, and, thereafter, stopping the movement of a gripping body base 3h toward a heat exchanger 5 by causing a moving gripping body base 3h to come into contact with Aa a reference platform A setting protrusion length of a tube 7 protruded from an end plate 5a, and, after that, firmly fixing and holding said gripping body base 3h and a reference platform A through a locking means Ab, and, thereafter, causing a part of the tip of a flare punch 10 to enter into a tube opening portion 7b by moving a flare base B having a flare pipe 10a with a flare punch 10 for a flared processing at the tip of said tube opening portion 7b and maintaining the contact, when a tube expansion 7d in predetermined length is formed by pressing a tube expansion mandrel 2 into a tube opening portion 7b of a tube 7 protruded from an end plate 5a, wherein a tube expansion mandrel 2 exists in said gripping body 3 in freely reciprocating fashion, and, thereafter, gripping a tube expansion 7d by a plurality of tube contacting members 3f through causing a sliding base 3d with a gripping body sliding means Xa fitting onto and sliding on a gripping body 3 which is provided between the end plate 5a and a gripping body base 3h and has a plurality of tube contacting members to move C1 toward a heat exchanger, and, thereafter, connecting said flare base B and a gripping body base 3h while expanding a tube 7 or after a tube expansion by moving a tube expansion mandrel 2 again, wherein said flare base B exists more rearward than a gripping body base 3h with a certain distance, has a predetermined length, so that a tube expansion mandrel 2 becomes fitting onto condition within a gripping body base 3, and has a flare pipe 10a with a flare punch for flared processing at the tip, conducting a predetermined flared processing by pressing the flare punch 10 into the tube expansion 7d of a tube opening portion 7b side through drawing toward the gripping body base 3h, which is firmly fixed and held to a reference platform A using locking means, via a connecting and tensile force generating means that generate a tensile force in a direction of drawing both toward each other across a fixed distance, and, thereafter, releasing a tube expansion 7d from a gripping of tube contacting member 3f by causing a sliding base 3d to retreat C2 from a heat exchanger 5, retreating each of a flare base B, a gripping body base 3h and a sliding base 3d from a heat exchanger 5.

In addition, in each of said above manufacturing method, the tip of a tube contacting member is caused to come into contact with an end plate 5a of a heat exchanger when moving a gripping body base 3h toward said heat exchanger 5, and then, with keeping the contact status, the protrusion length from an end plate 5a of a tube 7 is set by coming said gripping body base 3h into contact with Aa a reference platform through causing said tube contacting member 3f to further move toward a heat exchanger through said gripping body base 3h.

Furthermore, a distance adjustment means which is able to set the adjustment for the distance between a flare base B and a gripping body base 3h during a flared processing is provided at least at any of said connecting and tensile force generating means, a flare base B and/or a gripping body base 3h.

An air conditioner 20 with a heat exchanger 5 manufactured in each of said above manufacturing method is also provided.

Additionally, an outdoor unit 21 used for an air conditioner 20 with a heat exchanger 5 manufactured in each of said above manufacturing methods is provided.

Furthermore, the present invention provides a manufacturing device for a heat exchanger realizing each of the manufacturing method wherein a tube expansion device 1 with a tube expansion mandrel 2 in predetermined length in a freely reciprocating fashion which can expand said tube 7 in predetermined length from a tube opening portion 7b side of a tube 7 protruded from said end plate 5a of a heat exchanger has a surface freely expanding and shrinking radially in a direction crossing the longitudinal direction of a tube 7 from t a tube opening 7b side of a tube 7 protruded from the end plate 5a and expanding radially towards the direction of a tube 7 at outer circumference, and the manufacturing device for a heat exchanger comprises: a gripping body base 3h with a gripping body 3 having a plurality of tube contacting members 3f which can cover said tube 7, a first reciprocating means causing said gripping body base 3h to move toward a heat exchanger 5, a reference platform A stopping movement of a gripping body base 3h toward a heat exchanger 5 by causing a gripping body base 3h moving toward a heat exchanger 5 to come into contact with said reference platform A through said first reciprocating means and freely reciprocating through a second reciprocating means in order to set a protrusion length of a tube 7 protruded from an end plate 5a, a lock means Ab firmly fixing and holding said reference platform A and said gripping body base 3h, a gripping body sliding means Xa which is provided with a third reciprocating means between said end plate 5a and the gripping body base 3h, and can fit onto and slide on a gripping body 3 having said plurality of the tube contacting member 3f, a sliding base 3d with the gripping body sliding means Xa wherein each of a plurality of tube contacting members 3f is caused to be reduced in diameter by causing said gripping body sliding means Xa to move C1 toward a heat exchanger through a third reciprocating means, a tube expansion portion 7d formed by said tube expansion mandrel 2 is gripped by a plurality of tube contacting members 3f, a gripping body sliding means Xa is retreated C2 from a heat exchanger 5 through a third reciprocating means, and a tube expansion portion 7d is released from the gripping of a tube contacting member 3f, a flare base B which exists more rearward than said gripping body base 3h with a certain distance, fits onto a tube expansion mandrel 2 within said gripping body base 3 and has a flare pipe 10a in predetermined length with a flare punch 10 for flared processing at the tip, and a connecting and tensile force generating means which connects said flare base B and said gripping body base 3h and generates a tensile force in a direction of drawing each other across a fixed distance.

Furthermore, in the above manufacturing device for said heat exchanger, a distance adjustment means which is able to set the adjustment for the distance between a flare base B and a gripping body base 3h during the flared processing is provided at least at any of a connecting and tensile force generating means, a flare base B and/or a gripping body base 3h.

Additionally, an air conditioner 20 with a heat exchanger 5 manufactured by the above manufacturing device for said heat exchanger is provided.

In addition, an outdoor unit 21 used for an air conditioner 20 with a heat exchanger 5 manufactured by the above manufacturing device for said heat exchanger is provided.

The present invention has remarkable effects to manufacture a heat exchanger through a method, wherein, a heat exchanger 5 comprises a plurality of heat radiating fins, end plates 5a sandwiching said plurality of heat radiating fins and a tube 7 inserted to each of end plates, and freely expands and shrinks radially in a direction crossing the longitudinal direction of a tube 7 from a tube opening 7b side of a tube 7 protruded from an end plate 5a, and has a surface expanding radially toward the direction of a tube 7 at outer circumference, and the method comprises: causing a gripping body base 3h with a gripping body 3 having a plurality of tube contacting members 3f which can cover said tube 7 to move toward a heat exchanger 5, and, thereafter, stopping the movement of a gripping body base 3h toward a heat exchanger 5 by causing a moving gripping body base 3h to come into contact with Aa a reference platform A setting protrusion length of a tube 7 protruded from an end plate 5a, and, after that, firmly fixing and holding said gripping body base 3h and a reference platform A through a locking means Ab, and, thereafter, forming a tube expansion 7d in predetermined length by pressing a tube expansion mandrel 2 into a tube opening portion 7b of a tube 7 protruded from an end plate 5a, wherein a tube expansion mandrel 2 exists in said gripping body 3 in freely reciprocating fashion, and, after that, gripping a tube expansion portion 7d by a plurality of tube contacting members 3f through causing a sliding base 3d with a gripping body sliding means Xa fitting onto and sliding on a gripping body 3 which is provided between said end plate 5a and a gripping body base 3h and has said plurality of tube contacting members to move C1 toward a heat exchanger, and, thereafter, releasing a tube expansion portion 7d from the gripping of a tube contacting member 3f by retreating C2 a sliding base 3d from a heat exchanger 5, after having expanded a tube 7 by moving forward a tube expansion mandrel 2 again, and, thereafter, connecting the flare base B and a gripping body base 3h, wherein a flare base B exists more rearward than a gripping body base 3h with a certain distance, has a predetermined length so that a tube expansion mandrel 2 becomes fitting onto condition within a gripping body base 3 and has a flare pipe 10a with a flare punch for flared processing at the tip, conducting a predetermined flared processing 7j by pressing a flare punch 10 into a tube expansion portion 7d at a tube opening portion 7b side through pulling C3 toward a gripping body base 3h, which is firmly fixed and held to a reference platform A through locking means, via a connecting and tensile force generating means that generates a tensile force in a direction of pulling toward each other in a certain distance, and, thereafter, retreating each of a flare base B, a gripping body base 3h and a sliding base 3d from the heat exchanger 5. The present invention makes it possible to cause a flare base B conducting the flared processing to move toward a gripping body base 3h with pulling in a constant distance, therefore, even if the position of a tube opening portion 7b of a tube 7 of a heat exchanger 5, for which tube expansion is conducted (the total length of a heat exchanger changes due to the length of a tube used for a heat exchanger for which tube expansion is conducted, causing an end plate position change) changes depending on the type of a heat exchanger, an adjusting device for adjusting the stop position of a flare base (flare plate) is not required and any complex adjustment work is not necessary, and flares of the same shape are formed in constant certain depth at a tube opening portion 7b of a tube 7 of the variety of heat exchangers 5 having different total lengths in the longitudinal direction of a tube.

The present invention has remarkable effects in manufacturing a heat exchanger through a method, wherein a heat exchanger 5 comprises a plurality of heat radiating fins 6, end plates 5a sandwiching said plurality of heat radiating fins, and a tube 7 inserted to each of the end plates, and freely expands and shrinks radially in a direction crossing the longitudinal direction of the tube 7 from a tube opening portion 7b side of a tube 7 protruded from an end plate 5a, and has a surface expanding radially toward the direction of a tube 7 at outer circumference, and the method comprises: causing a gripping body base 3h with a gripping body 3 having said plurality of tube contacting members 3f which can cover said tube 7 to move toward a heat exchanger 5, and, thereafter, stopping the movement of a gripping body base 3h toward a heat exchanger 5 by causing a moving gripping body base 3h to come into contact with Aa a reference platform A setting protrusion length of a tube 7 protruded from an end plate 5a, and, after that, firmly fixing and holding said gripping body base 3h and a reference platform A through a locking means Ab, and, thereafter, forming a tube expansion 7d in predetermined length by pressing a tube expansion mandrel 2 into a tube opening portion 7b of a tube 7 protruded from an end plate 5a, wherein a tube expansion mandrel 2 exists in said gripping body 3 in freely reciprocating fashion, and, after that, gripping a tube expansion 7d by a plurality of tube contacting members 3f through causing a sliding base 3d with a gripping body sliding means Xa fitting onto and sliding on a gripping body 3 which is provided between said end plate 5a and a gripping body base 3h and has a plurality of tube contacting members to move C1 toward a heat exchanger, and, thereafter, connecting said flare base B and a gripping body base 3h, wherein the flare base B exists more rearward than the gripping body base 3h with a certain distance, has a predetermined length so that a tube expansion mandrel 2 becomes fitting onto condition within a gripping body base 3 and has a flare pipe 10a with a flare punch for flared processing at the tip, conducting a predetermined flared processing 7j by pressing a flare punch 10 into a tube expansion 7d at a tube opening portion 7b side through pulling C3 toward a gripping body base 3h, which is firmly fixed and held to a reference platform A through locking means, via a connecting and tensile force generating means that generates a tensile force in a direction of pulling toward each other with a certain distance, and, thereafter, releasing a tube expansion 7d from a gripping of tube contacting member 3f by causing a sliding base 3d to retreat C2 from a heat exchanger 5, and retreating a flare base B, a gripping body base 3h and a sliding base 3d from a heat exchanger. The present invention has an effect to makes it possible to shorten the entire process to almost half, comparing the entire process time performing the second and third flare tube expansion after the first tube expansion and realize the tube expansion process with extremely high productivity, through conducting a process causing a flare base B to move toward a gripping body base 3h with pulling in a constant distance during the process in which a tube expansion mandrel 2 expands a tube 7 (during a first tube expansion), and the present invention also has a remarkable effect that, even if the position of a tube opening portion 7b of a tube 7 of a heat exchanger 5, for which tube expansion is conducted (the total length of a heat exchanger changes due to the length of a tube used for a heat exchanger for which tube expansion is conducted, causing an end plate position change) changes depending on the type of a heat exchanger, an adjusting device for adjusting the stop position of a flare base (flare plate) is not required and any complex adjustment work is not necessary, and flares of the same shape are formed in constant certain depth at a tube opening portion 7b of a tube 7 of the variety of heat exchangers 5 having different total lengths in the longitudinal direction of a tube.

The present invention has remarkable effects in manufacturing a heat exchanger through a method, wherein a heat exchanger 5 comprises a plurality of heat radiating fins 6, end plates 5a sandwiching said plurality of heat radiating fins, and a tube 7 inserted to each of the end plates, and freely expands and shrinks radially in a direction crossing the longitudinal direction of the tube 7 from a tube opening portion 7b side of a tube 7 protruded from an end plate 5a, and has a surface expanding radially toward the direction of a tube 7 at outer circumference, and the method comprises: causing a gripping body base 3h with a gripping body 3 having said plurality of tube contacting members 3f which can cover said tube 7 to move toward a heat exchanger 5, and, thereafter, stopping the movement of a gripping body base 3h toward a heat exchanger 5 by causing a moving gripping body base 3h to come into contact with Aa a reference platform A setting protrusion length of a tube 7 protruded from an end plate 5a, and, after that, firmly fixing and holding said gripping body base 3h and a reference platform A through a locking means Ab, and, thereafter, causing a part of the tip of a flare punch 10 to enter into a tube opening portion 7b by moving a flare base B having a flare pipe 10a with a flare punch 10 for a flared processing at the tip of said tube opening portion 7b and maintaining the contact, when a tube expansion 7d in predetermined length is formed by pressing a tube expansion mandrel 2 into a tube opening portion 7b of a tube 7 protruded from an end plate 5a, wherein a tube expansion mandrel 2 exists in said gripping body 3 in freely reciprocating fashion, and, thereafter, gripping a tube expansion 7d by a plurality of tube contacting members 3f through causing a sliding base 3d with a gripping body sliding means Xa fitting onto and sliding on a gripping body 3 which is provided between the end plate 5a and a gripping body base 3h and has a plurality of tube contacting members to move C1 toward a heat exchanger, and, thereafter, connecting said flare base B and a gripping body base 3h while expanding a tube 7 or after a tube expansion by moving a tube expansion mandrel 2 again, wherein the flare base B exists more rearward than a gripping body base 3h with a certain distance, has a predetermined length, so that a tube expansion mandrel 2 becomes fitting onto condition within a gripping body base 3, and has a flare pipe 10a with a flare punch for flared processing at the tip, conducting a predetermined flared processing 7j by pressing a flare punch 10 into a tube expansion 7d at a tube opening portion 7b side through pulling C3 toward a gripping body base 3h, which is firmly fixed and held to a reference platform A through locking means, via a connecting and tensile force generating means that generates a tensile force in a direction of pulling toward each other with a certain distance, and, thereafter, releasing a tube expansion 7d from a gripping of tube contacting member 3f by causing a sliding base 3d to retreat C2 from a heat exchanger 5, and retreating a flare base B, a gripping body base 3h and a sliding base 3d from a heat exchanger. The present invention makes it possible that contact impact between a tube opening portion 7d and the tip of a flare punch 10 can be avoided in advance by conducting the flared processing during the process that a part of the tip of a flare punch 10 is caused to enter into a tube opening portion 7b and to maintain the contact and a tube expansion mandrel 2 expands a tube 7 (during the first tube expansion) or after a tube expansion (after the first tube expansion) prior to the process causing the flare base B conducting the flared processing to move toward a gripping body base 3h with pulling in a constant distance, as a result, deformation of a tube opening portion 7b due to seizure, etc. or a damage to a flare punch 10 can be prevented, and thereby the present invention has an effect to manufacture a heat exchanger in very low rejection rate, can shorten the entire process time, comparing the entire process time performing the second and third flare tube expansions after the first tube expansion, and can realize the tube expansion process with extremely high productivity, and the present invention also has remarkable effects that, even if the position of a tube opening portion 7b of a tube 7 of a heat exchanger 5, for which tube expansion is conducted (the total length of a heat exchanger changes due to the length of a tube used for a heat exchanger for which tube expansion is conducted, causing an end plate position change) changes depending on the type of a heat exchanger, an adjusting device for adjusting the stop position of a flare base (flare plate) is not required and any complex adjustment work is not necessary, and flares of the same shape are formed in constant certain depth at a tube opening portion 7b of a tube 7 of the variety of heat exchangers 5 having different total lengths in the longitudinal direction of a tube.

Each of the above invention has the effect that, even if each tube inserted in a zigzag pattern to a heat radiating fin of a heat exchanger forms multiple columns such as 3 columns, 4 columns, etc. to narrow each other's distance, a tube located inside can be held surely and solidly as is the case with a tube located outside; and even if the tube diameter of a tube 7 of a heat exchanger, for which tube expansion is conducted, varies due to kinds of specifications of a heat exchanger, a tube opening portion 7b side of a tube 7 can be held surely and solidly by a gripping body 3 having a plurality of tube contacting members 3f and the complicated flared processing can be conducted for a tube 7 in the same process.

Furthermore, each of the above invention has the effect that, the position of an end plate 5a and the protrusion length of a tube 7 protruded from an end plate 5a can be always maintained easily and surely through a freely reciprocating reference platform A, even if the kind of a heat exchanger 5 for which tube expansion is conducted (total length, etc) is changed as required, in the event that, when moving a gripping body base 3h toward said heat exchanger 5, the tip of a tube contacting member 3f is caused to be come into contact with an end plate 5a of a heat exchanger, and then, with keeping the contact status, said tube contacting member 3f is caused to further move toward a heat exchanger 5 through said gripping body base 3h, said gripping body base 3h is caused to be come into contact with Aa a reference platform A and the protrusion length of a tube 7 from an end plate is set.

In addition, each of the above invention has the effect that, in the event that a distance adjustment device which is able to set the adjustment for the distance between the flare base B and the gripping body base 3h during the flared processing is provided at least at any of a connecting and tensile force generating means, a flare base B and/or a gripping body base 3h, a heat exchanger 5 having flares in a constantly certain position and depth and in the same form can be manufactured in large quantities wherein a standard position and a standard depth is set easily and surely from time to time for the flared processing in forming the flares in constantly certain depth and form at a tube opening portion 7b of a tube 7 protruded in predetermined length from an end plate 5a of various heat exchangers 5 having an end plate 5a in different positions.

Furthermore, the present invention provides an air conditioner 20 with a heat exchanger 5 manufactured in each of the above methods, thereby can form flares in constantly certain depth and form at a tube opening portion 7b of a tube 7 protruded in predetermined length from said end plate 5a even if the position of an end plate 5a of various heat exchangers 5 of which total length, etc. in longitudinal direction of a tube 7 are different from time to time depending on various heat exchangers 5, and thus has the effect to cause the air conditioner 20 with the high-quality heat exchanger 5 to be disseminated at the market wherein the heat exchanger 5 is easy to manage its quality when brazing a bend tube, etc. to said flared processing portion and can reduce the occurrences of failures such as water leakage.

In addition, the present invention provides an outdoor unit 21 to be used for an air conditioner 20 with a heat exchanger 5 manufactured in each of the above methods, thereby can form flares in constantly certain depth and form at a tube opening portion 7b of a tube 7 protruded in predetermined length from the end plate 5a even if the position of an end plate 5a of various heat exchangers 5 of which total length, etc. in longitudinal direction of a tube 7 are different from time to time depending on various heat exchangers 5, and thus has the effect to cause the air conditioner 20 with the high-quality heat exchanger 5 to be disseminated at the market wherein the heat exchanger 5 is easy to manage its quality when brazing a bend tube, etc. to the flared processing portion and can reduce the occurrences of failures such as water leakage.

DETAILED DESCRIPTION OF THE INVENTION

Manufacturing device for a heat exchanger to carry out the manufacturing method of a heat exchanger of the present invention is explained below based on drawings. The present invention comprises a tube expansion device of the unexamined patent application publication No. 2002-205134 (a tube expansion device with a reference platform A being able to set the protrusion length of a tube 7 from an end plate 5a through a gripping body base 3h to be described below) as explained in the prior art, a tube expansion device of the unexamined patent application publication No. 2000-301271 (a first plate member 3h with a gripping body 3 having a plurality of tube contacting members 3f (hereinafter referred to as gripping body base 3h), a gripping body sliding means fitting onto and sliding on a gripping body 3, a second plate body 3d causing a plurality of tube contacting members 3f to grip a tube expansion portion 7d by reducing the diameter of each of a plurality of tube contacting members 3f (hereinafter referred to as sliding base 3d)) and a flare plate to conduct a predetermined flared processing 7j by pressing a flare punch 10 into a tube expansion portion 7d of a tube opening portion 7b (hereinafter referred to as flare base B), and the explanation below on each part is performed utilizing the numbers used for the part in the unexamined patent application publication No. 2000-301271 and explanations, operations, etc. for overlapping portions are omitted below.

Figure 1:
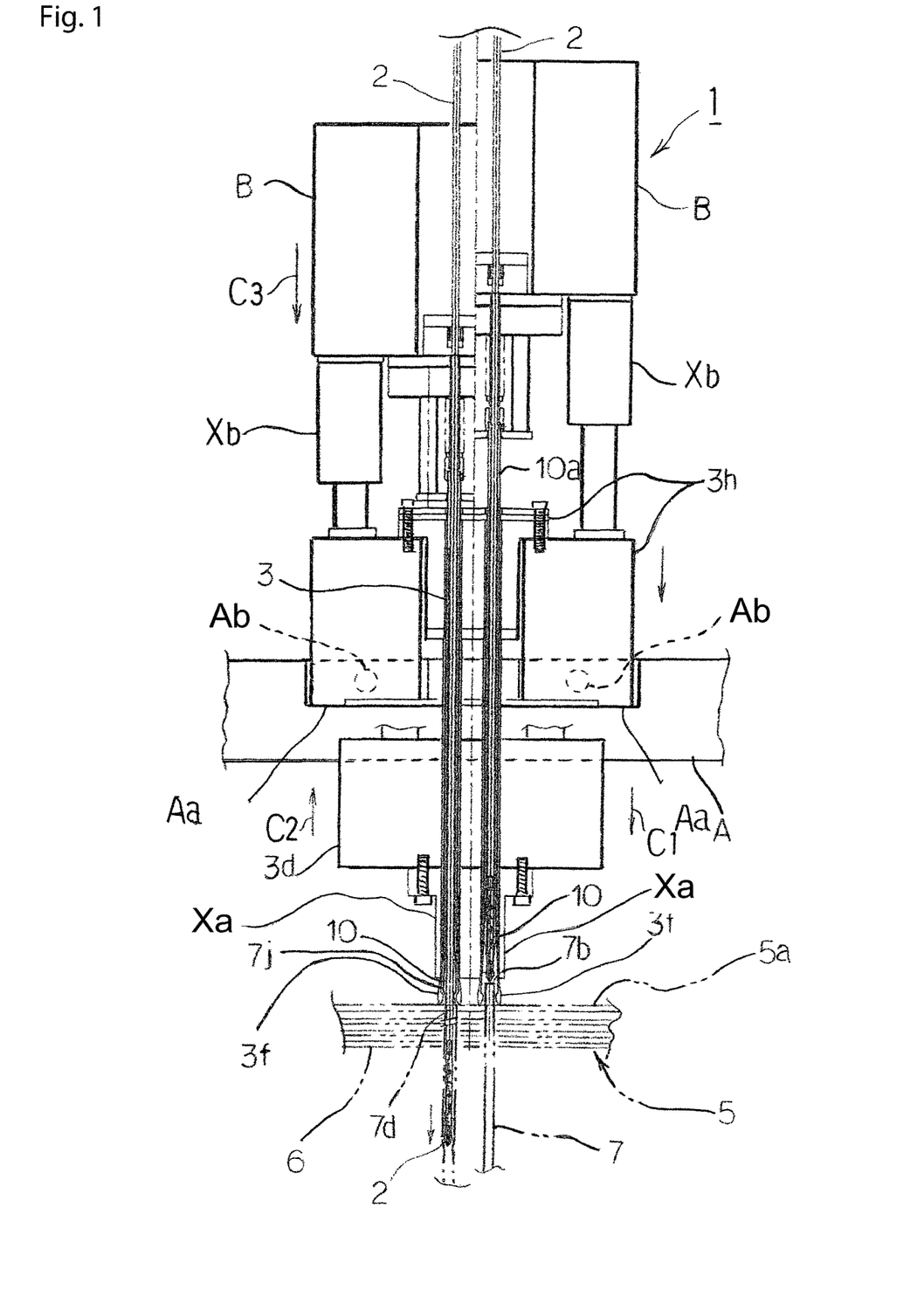
FIG. 1 is a partially omitted explanatory view illustrating manufacturing apparatus for a heat exchanger for carrying out the manufacturing method of the heat exchanger of the present invention.

1 of FIG. 1 illustrates a manufacturing device for a heat exchanger which enlarges its principal part, and such a manufacturing device 1 comprises: a tube expansion mandrel 2 in freely reciprocating fashion and in predetermined length, which can expand the tube 7 in predetermined length from a tube opening portion 7b side of a tube 7 protruded from an end plate 5a of a heat exchanger 5, and, in addition, a surface at outer circumference freely expanding and shrinking radially in a direction crossing the longitudinal direction of a tube 7 from a tube opening portion 7b side of a tube 7 protruded from said end plate 5a and expanding radially toward the direction of a tube 7, a gripping body base 3h with a gripping body 3 having a plurality of tube contacting members 3f which can cover said tube 7, a first reciprocating means (not pictured) using various cylinders utilizing oil pressure or a motor or various ball screws causing said gripping body base 3h to move toward a heat exchanger 5, a reference platform stopping movement of a gripping body base 3h toward a heat exchanger 5 by causing a gripping body base 3h moving toward a heat exchanger 5 to come into contact through said first reciprocating means and freely reciprocating through such a second reciprocating means (not pictured) which utilizes various ball screws or cylinder, etc. driven by a motor in order to set a protrusion length of a tube 7 protruded from an end plate 5a, a lock means Ab such as a lock pin, etc. driven through a motor, etc. in freely entering and exiting fashion to fix and hold firmly said reference platform A and said gripping body base 3h, a gripping body sliding means Xa which is provided with a third reciprocating means (not pictured) utilizing various ball screws or cylinders, etc. between said end plate 5a and a gripping body base 3h and can fit onto and slide on a gripping body 3 having said plurality of the tube contacting members 3f, and, a sliding base 3d with the gripping body sliding means Xa wherein each of a plurality of tube contacting members 3f is caused to be reduced in diameter by causing said gripping body sliding means Xa to move C1 toward a heat exchanger through a third reciprocating means, a tube expansion portion 7d formed by said tube expansion mandrel 2 is gripped by a plurality of tube contacting members 3f, a gripping body sliding means Xa is retreated C2 from a heat exchanger 5 through a third reciprocating means, and a tube expansion portion 7d is released from the gripping of a tube contacting member 3f, said flare base B which exists more rearward than said gripping body base 3h with a certain distance, fits onto a tube expansion mandrel 2 within said gripping body base 3 and has a flare pipe 10a with a flare punch 10 for flared processing at its tip, a connecting and tensile force generating means Xb which connects said flare base B and the gripping body base 3h and generates a tensile force in a direction of drawing each other across a fixed distance.

A method to manufacture a heat exchanger using the manufacturing device for a heat exchanger structured as stated the above is explained below.

A first manufacturing method, wherein a heat exchanger 5 comprises a plurality of heat radiating fins 6, end plates 5a sandwiching said plurality of heat radiating fins, and a tube 7 inserted to each of the end plates, and freely expands and shrinks radially in a direction crossing the longitudinal direction of the tube 7 from a tube opening portion 7b side of a tube 7 protruded from an end plate 5a, and has a surface expanding radially toward the direction of a tube 7 at outer circumference, and comprises: causing a gripping body base 3h with a gripping body 3 having a plurality of tube contacting members 3f which can cover said tube 7 to move toward a heat exchanger 5, and, thereafter, stopping the movement of a gripping body base 3h toward a heat exchanger 5 by causing a moving gripping body base 3h to come into contact with Aa a reference platform A setting protrusion length of a tube 7 protruded from an end plate 5a, and, after that, firmly fixing and holding the gripping body base 3h and a reference platform A through a locking means Ab, and, thereafter, forming a tube expansion 7d in predetermined length by pressing a tube expansion mandrel 2 into a tube opening portion 7b of a tube 7 protruded from an end plate 5a, wherein a tube expansion mandrel 2 exists in said gripping body 3 in freely reciprocating fashion, and, after that, gripping a tube expansion portion 7d by a plurality of tube contacting members 3f through causing a sliding base 3d with a gripping body sliding means Xa fitting onto and sliding on a gripping body 3 which is provided between said end plate 5a and a gripping body base 3h and has said plurality of tube contacting members to move C1 toward a heat exchanger, and, thereafter, releasing a tube expansion portion 7d from the gripping of a tube contacting member 3f by retreating C2 a sliding base 3d from a heat exchanger 5, after having expanded a tube 7 by moving forward a tube expansion mandrel 2 again, and, thereafter, connecting a flare base B and a gripping body base 3h, wherein the flare base B exists more rearward than a gripping body base 3h with a certain distance, has a predetermined length so that a tube expansion mandrel 2 becomes fitting onto condition within a gripping body base 3 and has a flare pipe 10a with a flare punch for flared processing at the tip, conducting a predetermined flared processing 7j by pressing a flare punch 10 into a tube expansion portion 7d at a tube opening portion 7b side through pulling C3 toward a gripping body base 3h, which is firmly fixed and held to a reference platform A through locking means, via a connecting and tensile force generating means that generates a tensile force in a direction of pulling toward each other in a certain distance, and, thereafter, retreating each of a flare base B, a gripping body base 3h and a sliding base 3d from the heat exchanger 5. The present invention makes it possible to cause a flare base B conducting the flared processing to move toward a gripping body base 3h with pulling in a constant distance, therefore, the present invention has remarkable effects that, even if the position of a tube opening portion 7b of a tube 7 of a heat exchanger 5, for which tube expansion is conducted (the total length of a heat exchanger changes due to the length of a tube used for a heat exchanger for which tube expansion is conducted, causing an end plate position change) changes depending on the type of a heat exchanger, an adjusting device for adjusting the stop position of a flare base (flare plate) is not required and any complex adjustment work is not necessary, and flares of the same shape are formed in constant certain depth at a tube opening portion 7b of a tube 7 of the variety of heat exchangers 5 having different total lengths in the longitudinal direction of a tube.

Furthermore, a second manufacturing method, wherein a heat exchanger 5 comprises a plurality of heat radiating fins 6, end plates 5a sandwiching said plurality of heat radiating fins, and a tube 7 inserted to each of the end plates, and freely expands and shrinks radially in a direction crossing the longitudinal direction of the tube 7 from a tube opening portion 7b side of a tube 7 protruded from an end plate 5a, and has a surface expanding radially toward the direction of a tube 7 at outer circumference, and comprises: causing a gripping body base 3h with a gripping body 3 having said plurality of tube contacting members 3f which can cover said tube 7 to move toward a heat exchanger 5, and, thereafter, stopping the movement of a gripping body base 3h toward a heat exchanger 5 by causing a moving gripping body base 3h to come into contact with Aa a reference platform A setting protrusion length of a tube 7 protruded from an end plate 5a, and, after that, firmly fixing and holding said gripping body base 3h and a reference platform A through a locking means Ab, and, thereafter, forming a tube expansion 7d in predetermined length by pressing a tube expansion mandrel 2 into a tube opening portion 7b of a tube 7 protruded from an end plate 5a, wherein a tube expansion mandrel 2 exists in said gripping body 3 in freely reciprocating fashion, and, after that, gripping a tube expansion 7d by a plurality of tube contacting members 3f through causing a sliding base 3d with a gripping body sliding means Xa fitting onto and sliding on a gripping body 3 which is provided between said end plate 5a and a gripping body base 3h and has a plurality of tube contacting members to move C1 toward a heat exchanger, and, thereafter, connecting the flare base B and a gripping body base 3h, wherein the flare base B exists more rearward than the gripping body base 3h with a certain distance, has a predetermined length so that a tube expansion mandrel 2 becomes fitting onto condition within a gripping body base 3 and has a flare pipe 10a with a flare punch for flared processing at the tip, conducting a predetermined flared processing 7j by pressing a flare punch 10 into a tube expansion 7d at a tube opening portion 7b side through pulling C3 toward a gripping body base 3h, which is firmly fixed and held to a reference platform A through locking means, via a connecting and tensile force generating means that generates a tensile force in a direction of pulling toward each other with a certain distance, and, thereafter, releasing a tube expansion 7d from a gripping of tube contacting member 3f by causing a sliding base 3d to retreat C2 from a heat exchanger 5, and retreating a flare base B, a gripping body base 3h and a sliding base 3d from a heat exchanger. The present invention has an effect to make it possible to shorten the entire process to almost half, comparing the entire process time performing the second and third flare tube expansion after the first tube expansion and realize the tube expansion process with extremely high productivity, through conducting a process causing a flare base B to move toward a gripping body base 3h with pulling in a constant distance during the process in which a tube expansion mandrel 2 expands a tube 7 (during a first tube expansion), and the present invention also has remarkable effects that, even if the position of a tube opening portion 7b of a tube 7 of a heat exchanger 5, for which tube expansion is conducted (the total length of a heat exchanger changes due to the length of a tube used for a heat exchanger for which tube expansion is conducted, causing an end plate position change) changes depending on the type of a heat exchanger, an adjusting device for adjusting the stop position of a flare base (flare plate) is not required and any complex adjustment work is not necessary, and flares of the same shape are formed in constant certain depth at a tube opening portion 7b of a tube 7 of the variety of heat exchangers 5 having different total lengths in the longitudinal direction of a tube.

Furthermore, a third manufacturing method, wherein a heat exchanger 5 comprises a plurality of heat radiating fins 6, end plates 5a sandwiching said plurality of heat radiating fins, and a tube 7 inserted to each of the end plates, and freely expands and shrinks radially in a direction crossing the longitudinal direction of the tube 7 from a tube opening portion 7b side of a tube 7 protruded from an end plate 5a, and has a surface expanding radially toward the direction of a tube 7 at outer circumference, and comprises: causing a gripping body base 3h with a gripping body 3 having said plurality of tube contacting members 3f which can cover said tube 7 to move toward a heat exchanger 5, and, thereafter, stopping the movement of a gripping body base 3h toward a heat exchanger 5 by causing a moving gripping body base 3h to come into contact with Aa a reference platform A setting protrusion length of a tube 7 protruded from an end plate 5a, and, after that, firmly fixing and holding said gripping body base 3h and a reference platform A through a locking means Ab, and, thereafter, causing a part of the tip of a flare punch 10 to enter into a tube opening portion 7b by moving said flare base B having a flare pipe 10a with a flare punch 10 for the flared processing at the tip of said tube opening portion 7b and maintaining the contact, when a tube expansion 7d in predetermined length is formed by pressing a tube expansion mandrel 2 into a tube opening portion 7b of a tube 7 protruded from an end plate 5a, wherein a tube expansion mandrel 2 exists in said gripping body 3 in freely reciprocating fashion, and, thereafter, gripping a tube expansion 7d by a plurality of tube contacting members 3f through causing a sliding base 3d with a gripping body sliding means Xa fitting onto and sliding on a gripping body 3 which is provided between the end plate 5a and a gripping body base 3h and has a plurality of tube contacting members to move C1 toward a heat exchanger, and, thereafter, connecting the flare base B and a gripping body base 3h while expanding a tube 7 or after a tube expansion by moving a tube expansion mandrel 2 again, wherein the flare base B exists more rearward than a gripping body base 3h with a certain distance, has a predetermined length, so that a tube expansion mandrel 2 becomes fitting onto condition within a gripping body base 3, and has a flare pipe 10a with a flare punch for flared processing at the tip, conducting a predetermined flared processing 7j by pressing a flare punch 10 into a tube expansion 7d at a tube opening portion 7b side through pulling C3 toward a gripping body base 3h, which is firmly fixed and held to a reference platform A through locking means, via a connecting and tensile force generating means that generates a tensile force in a direction of pulling toward each other with a certain distance, and, thereafter, releasing a tube expansion 7d from a gripping of tube contacting member 3f by causing a sliding base 3d to retreat C2 from a heat exchanger 5, and retreating a flare base B, a gripping body base 3h and a sliding base 3d from a heat exchanger 5. The present invention makes it possible that contact impact between a tube opening portion 7b and the tip of a flare punch 10 can be avoided in advance by conducting the flared processing during the process that a part of the tip of a flare punch 10 is caused to enter into a tube opening portion 7b and to maintain the contact and the tube expansion mandrel 2 expands the tube 7 (during the first tube expansion) or after the tube expansion (after the first tube expansion) prior to the process causing a flare base B conducting the flared processing to move toward a gripping body base 3h with pulling in a constant distance, as a result, deformation of a tube opening portion 7b due to seizure, etc. or damage to the flare punch 10 can be prevented, and thereby the present invention has an effect to manufacture the heat exchanger in very low rejection rate, can shorten the entire process time, comparing the entire process time performing the second and third flare tube expansions after the first tube expansion, and can realize the tube expansion process with extremely high productivity, and the present invention has a remarkable effect that, even if the position of a tube opening portion 7b of a tube 7 of a heat exchanger 5, for which tube expansion is conducted (the total length of a heat exchanger changes due to the length of a tube used for a heat exchanger for which tube expansion is conducted, causing an end plate position change) changes depending on the type of a heat exchanger, an adjusting device for adjusting the stop position of a flare base (flare plate) is not required and any complex adjustment work is not necessary, and flares of the same shape are formed in constant certain depth at a tube opening portion 7b of a tube 7 of the variety of heat exchangers 5 having different total lengths in the longitudinal direction of a tube.

Thus, each of the above manufacturing methods has the effect that, even if each tube inserted in a zigzag pattern to a heat radiating fin of a heat exchanger forms multiple columns such as 3 columns, 4 columns, etc. to narrow each other's distance, a tube located inside can be held surely and solidly as is the case with a tube located outside; and even if the tube diameter of a tube 7 of a heat exchanger, for which tube expansion is conducted, varies due to kinds of specifications of a heat exchanger, a tube opening portion 7b side of a tube 7 can be held surely and solidly by a gripping body 3 having a plurality of tube contacting members 3f and the complicated flared processing can be conducted for a tube 7 in the same process.

Furthermore, each of the above invention has the effect that, the position of an end plate 5a and the protrusion length of the tube 7 protruded from the end plate 5a can be always maintained easily and surely using the freely reciprocating reference platform A, even if the kind of a heat exchanger 5 for which tube expansion is conducted (total length, etc) is changed from time to time, in the event that, when moving the gripping body base 3h toward said heat exchanger 5, the tip of said tube contacting member 3f is caused to come into contact with an end plate 5a of a heat exchanger 5, and with keeping the contact status, the tube contacting member 3f is caused to further move toward a heat exchanger 5 through said gripping body base 3h, the protrusion length of a tube from said end plate 5a is set by causing the gripping body base 3h to come into contact with a reference base A.

In addition, each of the above invention has the effect that, in the event that a distance adjustment device which is able to set the adjustment for the distance between the flare base B and the gripping body base 3h during the flared processing is provided at least at any of a connecting and tensile force generating means, a flare base B and/or a gripping body base 3h, a heat exchanger 5 having flares in a constantly certain position and depth and in the same form can be manufactured in large quantities wherein a standard position and a standard depth is set easily and surely from time to time for the flared processing in forming the flares in constantly certain depth and form at a tube opening portion 7b of a tube 7 protruded in predetermined length from an end plate 5a of various heat exchangers 5 having an end plate 5a in different positions.

Figure 2A:
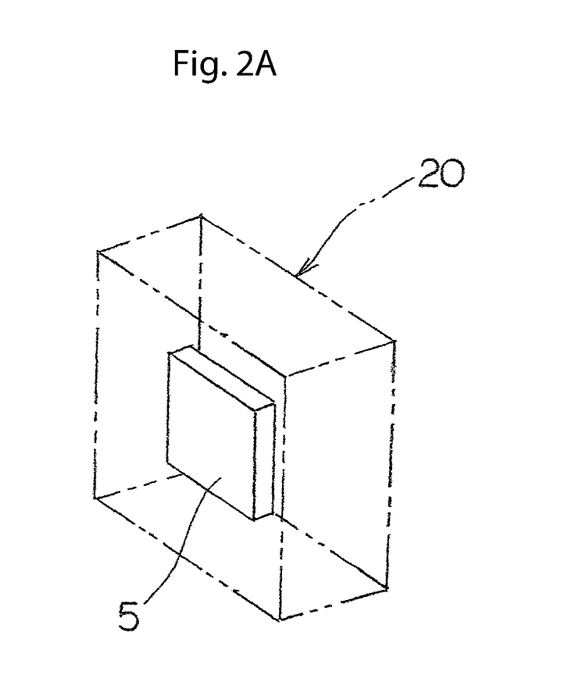
FIGS. 2A and 2B illustrate a heat exchanger that is produced by the manufacturing method for the heat exchanger of the present invention, FIG. 2A indicating an air conditioner having a heat exchanger, and FIG. 2B showing the outdoor unit for use in an air conditioner equipped with a heat exchanger.

Furthermore, the present invention provides an air conditioner 20 with a heat exchanger 5 manufactured in each of the above methods, thereby can form flares in constantly certain depth and form at a tube opening portion 7b of a tube 7 protruded in predetermined length from said end plate 5a even if the position of an end plate 5a of various heat exchangers 5 of which total length, etc. in longitudinal direction of a tube 7 are different from time to time depending on various heat exchangers 5, and thus has the effect to cause the air conditioner 20 with the high-quality heat exchanger 5 to be disseminated at the market wherein the heat exchanger 5 is easy to manage its quality when brazing a bend tube, etc. to said flared processing portion and can reduce the occurrences of failures such as water leakage.

Figure 2B:
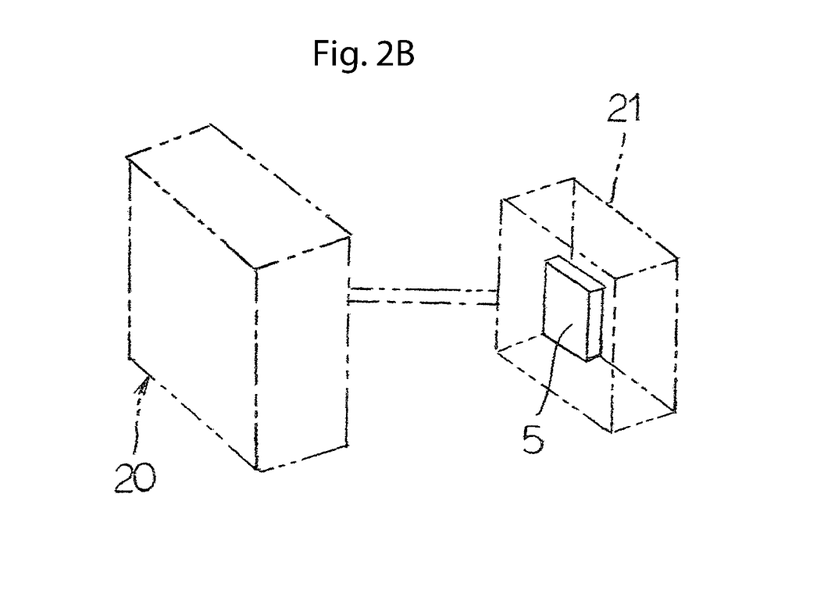

In addition, the present invention provides an outdoor unit 21 to be used for an air conditioner 20 with a heat exchanger 5 manufactured in each of the above methods, thereby can form flares in constantly certain depth and form at a tube opening portion 7b of a tube 7 protruded in predetermined length from said end plate 5a even if the position of an end plate 5a of various heat exchangers 5 of which total length, etc. in longitudinal direction of a tube 7 are different from time to time depending on various heat exchangers 5, and thus has the effect to cause the air conditioner 20 with the high-quality heat exchanger 5 to be disseminated at the market wherein the heat exchanger 5 is easy to manage its quality when brazing a bend tube, etc. to said flared processing portion and can reduce the occurrences of failures such as water leakage.

Furthermore, the tube expansion device to achieve the manufacturing method of a heat exchanger in the present invention is not necessarily a vertical type tube expansion device and may be so called a horizontal type device; and, in addition, it goes without saying that the numbers, arrangement, installment position, etc. of a gripping body, etc. having a plurality of tube contacting members in one embodiment of the present invention are not limited; moreover, specific shape and structure are not limited for a flare base, gripping body base, a sliding base, a reference base and a sliding method for a gripping body, etc.; additionally, while explanations are made for the case where various cylinders, various ball screws, etc. are used with oil pressure or motor for each reciprocation method of No. 1 to No. 3 as well as a connection and tractive force generation means, specific structure, shape, power source, etc. are not limited for each method, and also, it goes without saying that specific structure, etc. for the method of distance adjustment, etc. are freely changed in design at will within the scope intended by the present invention.

INDUSTRIAL APPLICABILITY

The current invention relates to a production method for a heat exchanger and its device, and an air conditioner with the heat exchanger manufactured using such method and/or its outdoor unit, wherein total length of a hairpin tube or a straight tube to be expanded can be remained approximately the same as the one prior to the expansion; and, even if the location of an end plate is different depending on kinds, etc. of a heat exchanger, a flared processing at a constantly certain location and in a constantly certain depth can be easily and surely conducted for a tube opening of a tube protruded from said end plate with a predetermined length; and further, complicated position adjustment work previously conducted and expensive adjustment device are not required for the flared processing which can be effectively conducted during the same primary tube expanding process.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A heat exchanger, comprising:
a plurality of heat radiating fins;
end plates sandwiching the plurality of heat radiating fins; and
a tube inserted to each of the end plates, wherein
the heat exchanger is manufactured by:
causing a gripping body base having a gripping body to move toward the heat exchanger, the gripping body having a plurality of tube contacting members, the tube contacting members capable of covering the tube and capable of expanding and shrinking radially in a direction crossing a longitudinal direction of the tube from a tube opening portion side of the tube protruded from the end plates;
stopping the movement of the gripping body base toward the heat exchanger by causing the gripping body base to come into contact with a reference platform, the reference platform setting a protrusion length of the tube protruded from the end plates;
firmly fixing and holding the gripping body base and the reference platform through a locking means;
forming a tube expansion portion having a predetermined length by pressing a tube expansion mandrel into the tube opening portion of the tube protruded from the end plates, the tube expansion mandrel being located in the gripping body;
gripping the tube expansion portion by the plurality of tube contacting members by causing a sliding base to move toward the heat exchanger, the sliding base having a gripping body sliding means fitted onto and sliding on the gripping body, the sliding base being provided between the end plates and the gripping body base;
causing the tube expansion mandrel to move forward to further expand the tube;
releasing the tube expansion portion from a gripping of the tube contacting members by causing the sliding base to retreat from the heat exchanger;
conducting a predetermined flaring process by pressing a flare punch into the tube expansion portion at the tube opening portion side by pulling a flare base toward the gripping body base, which is firmly fixed and held to the reference platform through the locking means, via a connecting and tensile force generating means that connects the flare base and the gripping body base and generates a tensile force in a direction of pulling the flare base and the gripping body base toward each other, the flare base being located more apart from the heat exchanger than the gripping body base, the flare base having a flare pipe, the flare pipe having a predetermined length so that the flare pipe is fitted on the tube expansion mandrel within the gripping body base, the flare pipe having the flare punch at a tip; and
retracting each of the flare base, the gripping body base and the sliding base from the heat exchanger.

2. A heat exchanger, comprising:
a plurality of heat radiating fins;
end plates sandwiching the plurality of heat radiating fins; and
a tube inserted to each of the end plates, wherein
the heat exchanger is manufactured by:
causing a gripping body base having a gripping body to move toward the heat exchanger, the gripping body having a plurality of tube contacting members, the tube contacting members capable of covering the tube and capable of expanding and shrinking radially in a direction crossing a longitudinal direction of the tube from a tube opening portion side of the tube protruded from the end plates;
stopping the movement of the gripping body base toward the heat exchanger by causing the gripping body base to come into contact with a reference platform, the reference platform setting a protrusion length of the tube protruded from the end plates;
firmly fixing and holding the gripping body base and the reference platform through a locking means;
forming a tube expansion portion having a predetermined length by pressing a tube expansion mandrel into the tube opening portion side of the tube protruded from the end plates, the tube expansion mandrel being located in the gripping body;

gripping the tube expansion portion by the plurality of tube contacting members by causing a sliding base to move toward the heat exchanger, the sliding base having a gripping body sliding means fitted onto and sliding on the gripping body, the sliding base being provided between the end plates and the gripping body base;

conducting a predetermined flaring process, while further expanding the tube, by pressing a flare punch into the tube expansion portion at the tube opening portion side by pulling a flare base toward the gripping body base, which is firmly fixed and held to the reference platform through the locking means, via a connecting and tensile force generating means that connects the flare base and the gripping body base toward each other and generates a tensile force in a direction of pulling the flare base and the gripping body base toward each other, the flare base being located more apart from the heat exchanger than the gripping body base, the flare base having a flare pipe, the flare pipe having a predetermined length so that the flare pipe is fitted on the tube expansion mandrel within the gripping body base, the flare pipe having the flare punch at a tip;

releasing the tube expansion portion from a gripping of the tube contacting members by causing the sliding base to retreat from the heat exchanger; and retracting each of the flare base, the gripping body base and the sliding base from the heat exchanger.

3. A heat exchanger, comprising:

a plurality of heat radiating fins;

end plates sandwiching the plurality of heat radiating fins; and a tube inserted to each of the end plates, the heat exchanger is manufactured by:

causing a gripping body base having a gripping body to move toward the heat exchanger, the gripping body having a plurality of tube contacting members, the tube contacting members capable of covering the tube and capable of expanding and shrinking radially in a direction crossing a longitudinal direction of the tube from a tube opening portion side of the tube protruded from the end plates;

stopping the movement of the gripping body base toward the heat exchanger by causing the gripping body base to come into contact with a reference platform, the reference platform setting a protrusion length of the tube protruded from the end plates;

firmly fixing and holding the gripping body base and the reference platform through a locking means;

forming a tube expansion portion having a predetermined length by pressing a tube expansion mandrel into the tube opening portion of the tube protruded from the end plates and causing a part of a tip of a flare punch to enter into the tube opening portion by moving a flare base having a flare pipe toward the heat exchanger and maintaining a contact between the flare punch and the tube opening portion, the tube expansion mandrel being located in the gripping body, the flare pipe having the flare punch for a flaring process at a tip of the tube opening portion forming a tube expansion portion having a predetermined length by pressing the tube expansion mandrel into the tube opening portion of the tube protruded from the end plates and causing a part of a tip of a flare punch to enter into the tube opening portion by moving a flare base having a flare pipe toward the heat exchanger and maintaining a contact between the flare punch and the tube opening portion, the tube expansion mandrel being located in the gripping body, the flare pipe having the flare punch for a flaring process at a tip of the tube opening portion;

gripping the tube expansion portion by the plurality of tube contacting members by causing a sliding base having a gripping body sliding means fitted onto and sliding on the gripping body, the sliding base being provided between the end plates and the gripping body base;

conducting a predetermined flaring process, while or after further expanding the tube, by pressing the flare punch into the tube expansion portion at the tube opening portion side by pulling the flare base toward the gripping body base, which is firmly fixed and held to the reference platform through the locking means, via a connecting and tensile force generating means that connects the flare base and the gripping body base and generates a tensile force in a direction of pulling the flare base and the gripping body base toward each other, the flare base being located more apart from the heat exchanger than the gripping body base, the flare pipe having a predetermined length so that the flare pipe is fitted on the tube expansion mandrel within the gripping body base, the flare pipe having the flare punch at a tip; and releasing the tube expansion portion from a gripping of the tube contacting members by causing the sliding base to retreat from the heat exchanger, retracting each of the flare base, the gripping body base and the sliding base from the heat exchanger.

4. An air conditioner with the heat exchanger described in said claim 1.

5. An outdoor unit used for an air conditioner with the heat exchanger described in said claim 1.

* * * * *